March 21, 1961
C. A. EMBREE
2,976,061
HITCH
Filed Oct. 2, 1959
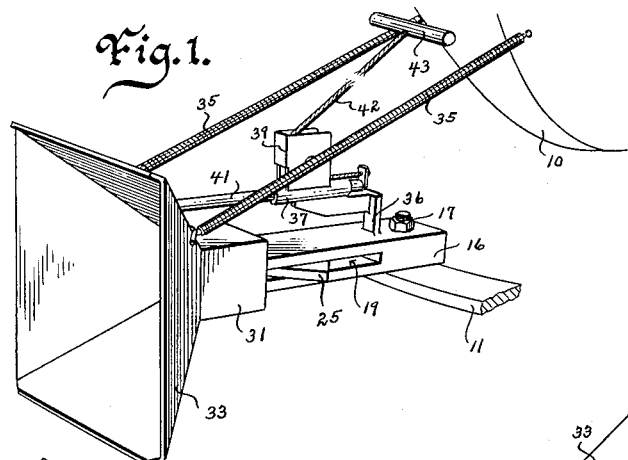
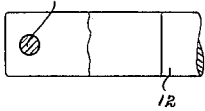
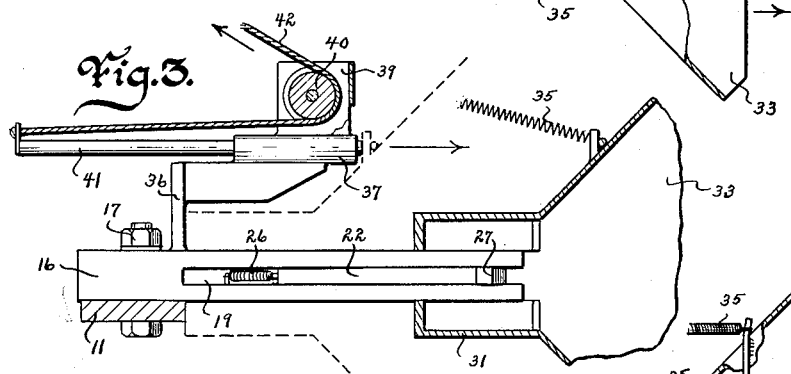
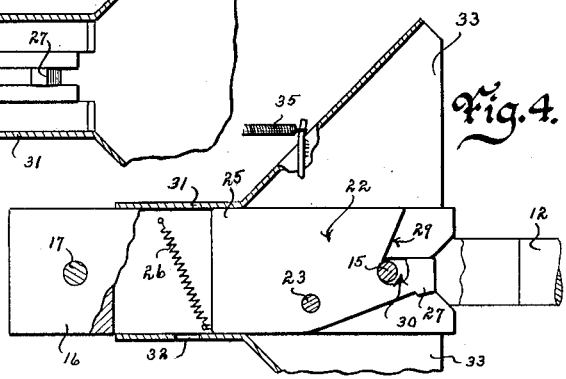
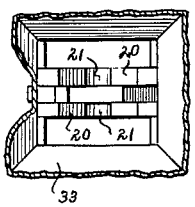
Inventor:—Clifford Albert Embree
by M. Talbert Dick
Attorney
Witness
Edward P. Seeley

United States Patent Office 2,976,061
Patented Mar. 21, 1961

2,976,061
HITCH
Clifford Albert Embree, Rte. 2, Villisca, Iowa
Filed Oct. 2, 1959, Ser. No. 844,094
5 Claims. (Cl. 280—509)

This invention relates to a hitch and more particularly to an automatic hitch used on a tractor for connecting an implement, wagon or like thereto.

Most pulled vehicles are detachably secured to the drawbar of a tractor by either a clevis pin means or bolt means. In either instance it is necessary for the tractor operator to dismount from the tractor to secure the tongue of the pulled vehicle to the drawbar and to again dismount to detach the tongue from the drawbar. Furthermore, it is most difficult to maneuver the tractor into a position where the tongue of the vehicle to be pulled is in position for the coupling phase.

Therefore one of the principal objects of my invention is to provide a hitch that will automatically connect to the tongue of the pulled vehicle or automatically release the connection without the necessity of the operator of the tractor dismounting from the tractor and manually effecting the coupling or uncoupling.

A further object of this invention is to provide a hitch for tractors and like that will guide the tongue of the vehicle to be pulled into position for locking.

More specifically, the object of this invention is to provide a hitch having a movable tongue guide chute that not only guides the tongue into the catch mechanism of the hitch, but automatically by its sliding action effects the locking and unlocking of the catch mechanism.

Still further objects of my invention are to provide a tractor or like hitch that is economical in manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my hitch mounted on a tractor and in position for receiving the tongue of an implement or vehicle;

Fig. 2 is an enlarged top plan sectional view of my device and more fully illustrates its construction;

Fig. 3 is a longitudinal sectional view of my hitch taken on line 3—3 of Fig. 2;

Fig. 4 is an enlarged top sectional view showing the catch means in locked position; and Fig. 5 is a cross-sectional view of the device taken on line 5—5 of Fig. 2.

In these drawings I have used the numeral 10 to generally designate the rear end portion of a tractor having the usual drawbar 11. The numeral 12 designates the tongue of a wagon, implement or like to be pulled. The forward end of the tongue 12 is biforked and carries the vertical pin 15 between its slit end. It is for such equipment that I use my hitch and which I will now describe in detail.

The numeral 16 designates a rectangular bar secured at its forward end to the rear end of the tractor or drawbar by any suitable means such as a bolt means 17. The rear end portion of this bar 16 is horizontally split to provide a horizontal slot 19 as shown in Fig. 3. The free end of the member 16 has a horizontal pin guide notch 20. This guide notch 20 is V-shaped and communicates with a rearwardly extending slot 21 as shown in Fig. 2. The notch 20 and slot 21 extend vertically through both the upper and lower forked ends of the member 16. The numeral 22 generally designates the locking bar. This locking bar is horizontally pivoted in the space 19 by a pin 23. This shaft pin 23 is located to the rear and right of the vertical slot 21 as shown in Fig. 2. The rear end of the lock 22 is rectangular and is capable of being rotated horizontally to a position where its rear left corner 25 protrudes from the horizontal slot 19 of the member 16 and assumes a position to the left of the bar 16 as shown in Fig. 2. The lock 22 is yieldingly held in such a position by a spring 26 which has one end secured to its right rear corner and its other end secured to the left side area of the member 16. When the corner 25 of the lock 22 is protruding from the left side of the bar 16, the forward right corner of the lock 22 will extend beyond the horizontal slot 19 and to the right of the member 16. This forward right corner of the lock 22 is designated by the numeral 27 and is in the form of a lug projection. The forward front left edge of the lock 22 is designated by the numeral 29 and extends rearwardly and inwardly at an angle relative to the longitudinal length of the lock 22. When the lock 22 is in open position with the corner portion 25 extending to the side of the bar 16, this forward edge of the lock 22 will extend across the vertical slot 21 of the member 16 at an angle. This forward edge 29 of the lock eventually terminates in an open hook area designated by the numeral 30. When the lock 22 is moved against the action of the spring 26 to a position where its longitudinal axis is parallel to the longitudinal axis of the member 16, this hook area 30 will communicate with but will close the forward entrance area of the vertical slot 21 as shown in Fig. 4. The numeral 31 designates a rectangular sleeve slidably mounted on the rear end portion of the bar-bearing 16. The numeral 32 designates a hole in one side of the sleeve 31 capable of being engaged by the lug portion 27 of the lock 22 for holding the sleeve 31 against rearward sliding movement when the lock 22 is in an open position. The numeral 33 designates a rectangular bell shaped chute on the rear end of the sleeve 31. This chute 33 extends rearwardly and outwardly as shown in Fig. 1. The numeral 35 designates two coil springs each having one end secured to the chute 33 and its other end secured to the tractor for yielding slidably holding the chute and sleeve 31 in a forward sliding position on the bar 16. The numeral 36 designates a bracket on the top of the bar 16 carrying a bearing 37 which extends longitudinally with the bar 16. The numeral 39 designates a bracket on the top of the bearing 37 rotatably carrying a pulley wheel 40. The numeral 41 designates a push shaft slidably mounted in the bearing 37 and having its forward end engaging the chute portion 33. The numeral 42 designates a flexible cable having one end secured to the forward end of the shaft 41 and its length extending around the pulley wheel 40. This cable 42 has its other end extending to the vicinity of the operation of the tractor and has a handle 43 to facilitate its manual movement. The practical operation of the device is as follows. When it is desired to hook onto the tongue or like of the vehicle to be pulled, the cable 42 is manually pulled to force the shaft 41 rearwardly. The shaft 41 carries with it the sleeve 31 and when the sleeve 31 is in a rear sliding position, the spring 26 will move the lug 27 into the sleeve hole 32 to be locked with sleeve 31 and chute 33 in a rear sliding position and against the action of the coil springs 35. With the various elements in such a position the lug 22 will be open and cocked. Merely by backing the tractor onto the tongue 12, the tongue 12 will be guided into the notch 20 and slot opening 21 by the flared sides of the chute 33. Therefore the contact is made without undue maneuvering of the tractor inasmuch as the end of the tongue 12 will be guided into position by the chute 33. As the pin 15 of the tongue enters the passageway 21 it will engage the sloping edge 29 of the lock 22. As the pin 15 moves further into the slot 21 it will cause the rotation of the lock 22 to a locked closed position as shown in Fig. 4. With the lock 22 in such locked position, its corner 25 and its lug 27 will be within the slot 19 of the bar 16 and the springs 35 will move the sleeve 31 and chute 33 forwardly as shown in Fig. 4. When the sleeve 31 is in such forward sliding position, it will enclose the forward sides of the slot 19 and thereby hold the lock 22 against rotation and in a locked position.

When it is desired to uncouple the pulled vehicle it is merely necessary to pull on the cable 42 to slide the sleeve 31 and chute 33 rearwardly. With the sleeve in this forward position, the spring 26 will move the lock 22 to an open position.

From the foregoing it will be seen that I have provided an easy operating, efficient, automatic hitch means for tractors and like.

Some changes may be made in the construction and arrangement of my hitch without departing from the real spirit and purpose of my invention, and it is my intention to cover by my claims, any modified forms of structure or use of mechanical equivalents which may be reasonably included within their scope.

I claim:

1. In a hitch, a bar adapted to have its forward end secured to a vehicle and having its rear end portion horizontally slotted, a lock member rotatably mounted in the slot of said bar having a hook portion at its forward end and capable of having a rear end portion extending laterally from the slot of said bar when in one position of its rotation, a vertical slot opening in the forward end portion of said bar capable of having its outlet closed by the hook portion of said lock member when said lock member is in a position where its rear end portion is totally within the horizontal slot of said bar, a sleeve slidably embracing said bar capable of holding the rear end portion of said lock member within the horizontal slot of said bar when in a forward position of its sliding movement, a means for yieldingly holding the rear end portion of said lock member in a position to extend laterally from the horizontal slot of said bar, and a means for yieldingly holding said sleeve in a forward position of its sliding movement.

2. In a hitch, a bar adapted to have its forward end secured to a vehicle and having its rear end portion horizontally slotted, a lock member rotatably mounted in the slot of said bar having a hook portion at its forward end and capable of having a rear end portion extending laterally from the slot of said bar when in one position of its rotation, a vertical slot opening in the forward end portion of said bar capable of having its outlet closed by the hook portion of said lock member when said lock member is in a position where its rear end portion is totally within the horizontal slot of said bar, a sleeve slidably embracing said bar capable of holding the rear end portion of said lock member within the horizontal slot of said bar when in a forward position of its sliding movement, a means for yieldingly holding the rear end portion of said lock member in a position to extend laterally from the horizontal slot of said bar, a means for yieldingly holding said sleeve in a forward position of its sliding movement, and a means for facilitating the manual rear sliding movement of said sleeve against the action of said last mentioned means for holding said sleeve in a forward position.

3. In a hitch, a bar adapted to have its forward end secured to a vehicle and having its rear end portion horizontally slotted, a lock member rotatably mounted in the slot of said bar having a hook portion at its forward end and capable of having a rear end portion extending laterally from the slot of said bar when in one position of its rotation, a vertical slot opening in the forward end portion of said bar capable of having its outlet closed by the hook portion of said lock member when said lock member is in a position where its rear end portion is totally within the horizontal slot of said bar, a sleeve slidably embracing said bar capable of holding the rear end portion of said lock member within the horizontal slot of said bar when in a forward position of its sliding movement, a means for yieldingly holding the rear end portion of said lock member in a position to extend laterally from the horizontal slot of said bar, a means for yieldingly holding said sleeve in a forward position of its sliding movement, a rearwardly extending flared tongue guiding chute in the rear end of said sleeve, and a means for facilitating the manual rear sliding movement of said sleeve against the action of said last mentioned means for holding said sleeve in a forward position.

4. In a hitch, a bar adapted to have its forward end secured to a vehicle and having its rear end portion horizontally slotted, a lock member rotatably mounted in the slot of said bar having a hook portion at its forward end and capable of having a rear end portion extending laterally from the slot of said bar when in one position of its rotation, a vertical slot opening in the forward end portion of said bar capable of having its outlet closed by the hook portion of said lock member when said lock member is in a position where its rear end portion is totally within the horizontal slot of said bar, a sleeve slidably embracing said bar capable of holding the rear end portion of said lock member within the horizontal slot of said bar when in a forward position of its sliding movement, a means for yieldingly holding the rear end portion of said lock member in a position to extend laterally from the horizontal slot of said bar, a means for yieldingly holding said sleeve in a forward position of its sliding movement, a rearwardly extending flared tongue guiding chute in the rear end of said sleeve, a means for facilitating the manual rear sliding movement of said sleeve against the action of said last mentioned means for holding said sleeve in a forward position; said sleeve having an opening, and a projection on said lock member capable of extending into the opening in said sleeve when the rear end portion of said lock member is extending laterally from the horizontal slot of said bar.

5. In a hitch, a bar adapted to have its forward end secured to a vehicle and having its rear end portion horizontally slotted, a lock member rotatably mounted in the slot of said bar having a hook portion at its forward end and capable of having a rear end portion extending laterally from the slot of said bar when in one position of its rotation, a vertical slot opening in the forward end portion of said bar capable of having its outlet closed by the hook portion of said lock member when said lock member is in a position where its rear end portion is totally within the horizontal slot of said bar, a sleeve slidably embracing said bar capable of holding the rear end portion of said lock member within the horizontal slot of said bar when in a forward position of its sliding movement, a means for yieldingly holding the rear end portion of said lock member in a position to extend laterally from the horizontal slot of said bar, a means for yieldingly holding said sleeve in a forward position of its sliding movement, and a means extending to a point remote from said bar for facilitating the manual rear sliding movement of said sleeve against the action of said last mentioned means for holding said sleeve in a forward position.

References Cited in the file of this patent

UNITED STATES PATENTS

| 482,546 | Clarke | Sept. 13, 1892 |
| 2,522,951 | Knox | Sept. 19, 1950 |
| 2,783,059 | Hartl | Feb. 26, 1957 |

FOREIGN PATENTS

| 188,175 | Switzerland | Mar. 1, 1937 |